Patented Aug. 28, 1945

2,383,863

UNITED STATES PATENT OFFICE 2,383,863

PROCESS FOR PREPARING KETENES

Richard Hueter, Dessau-Rosslau, Anhalt, Germany; vested in the Alien Property Custodian No Drawing. Application November 29, 1938, Serial No. 242,894. In Germany December 2, 1937

5 Claims. (Cl. 260—550)

This invention relates to processes for the preparation of higher molecular ketenes from the halogenides of highly molecular carboxylic acids by treating said halogenides with strong tertiary bases.

The ketenes obtained as a reaction product in the instant process form valuable intermediate products suitable for a large variety of organic chemical syntheses. They are especially valuable as acylating agents for all organic compounds which contain an active hydrogen atom as, for example, amines, hydroxy compounds, and their substitution products. Among the various compounds containing active hydrogen atoms may be mentioned beta-hydroxy-ethane-sulfonic acid, beta-methyl-amino-ethane-sulfonic acid, and the like. In addition to being reactive with the compounds containing active hydrogen atoms, the ketenes may also be used as addition agents for introduction at the double bonds of various organic compounds.

As raw materials for the processes of the present invention, one uses the halogenides of carboxylic acids, particularly the chlorides of aliphatic, cycloaliphatic, and fatty aromatic carboxylic acids, including both mono- and polybasic acids. As illustrative of the various types of carboxylic acids mention may be made of caproic acid, lauric acid, palmitic acid, oleic acid, montanic acid, naphthenic acid, nuclear alkylated aryl fatty acids containing at least one alkyl group, adipic acid, sebacic acid, cyclohexane diacetic acid, and the like. The hydrocarbon chains of these carboxylic acids may be interrupted by known hetero atoms or hetero atomic groups, as for example, oxygen, sulfur, and the like.

While a large variety of halogenides of higher molecular carboxylic acids may be used in the processes of the instant invention, it has been found that the halogenides of fatty acids containing at least 6 carbon atoms in the molecule are particularly suitable and produce especially desirable products. In accordance with a preferred embodiment, it is the practice to carry out the reaction with the strong tertiary bases in the presence of inert water-free solvents although it has been found that the reaction will take place in the absence of solvents.

Among the strong tertiary bases that are illustrative of those usable in accordance with the present invention are the trialkyl amines, such as trimethyl amine, triethyl amine, tripropyl amine, and the like, as well as alkylated ethylene diamine, alkyl piperidine, and like bases containing trivalent nitrogen.

When the treatment of the carboxylic acid halogenides with these bases takes place in the presence of water-free inert solvents, it is desirable to select solvents of a kind that the hydrohalogenides, such as the hydrochlorides, of the bases which are formed by the reaction are insoluble therein. If this selection is made, a simple separation of the reaction components is possible after completion of the reaction. Solvents of this type are, for example, carbon disulfide, and benzine, other organic solvents being also suitable. As previously stated the reaction can also be carried out in the absence of solvents, and it may in either case take place at normal or elevated temperatures.

The usual method for recovering the ketenes involves a separation of the hydrohalogenide of the base formed in the reaction by filtration and then evaporating the solvent from the filtrate in order to isolate the ketenes. The bases can be recovered from the hydrohalogenide in accordance with known procedures.

Many modifications in the processes of the instant invention will occur to those skilled in the art so the examples, in which the parts occur by weight, are to be considered purely as illustrative of preferred embodiments of the invention.

Example 1

Twenty one and nine tenths parts of the chloride of lauric acid is dissolved in 200 parts of freshly distilled carbon disulfide. To this solution one rapidly adds 101 parts of freshly distilled triethylamine while excluding the moisture of the air, and permits the mixture to stand for 24 hours. Thereupon, the triethylamine hydrochloride formed (13 parts) is filtered off. The filtrate consists of a 9% to 10% solution of decylketene. The ketene can be obtained by careful evaporation of the solvent from the filtrate, if practicable with the exclusion of air. The ketene remains in the form of an oily mass which slowly crystallizes at room temperatures. If the ketene is heated with alcoholic potassium hydroxide it forms potassium laurate.

Example 2

Two hundred and seventy five parts of the chloride of palmitic acid is dissolved in 300 volumes of dry benzol, and after the addition of 10 parts of triethylamine is allowed to stand for 24 hours. The triethylamine hydrochloride which separates therefrom is filtered off. The tetradecyl ketene so formed is isolated from the solution in the manner described in Example 1.

It should be understood that the present invention is not limited to the specific examples and illustrations of the compounds and the processes herein disclosed, but that it extends to all equivalent compounds and processes which one skilled in the art would consider within the scope of the appended claims.

In addition to the above named strong tertiary bases there are other bases especially of the higher molecular and mixed series, which may be used for making the prescribed process. Such strong tertiary bases are e. g. diethyl-propyl-amine, dimethyl-lauryl-amine, dimethyl-oleyl-amine, dimethyl-cyclo-hexyl-amine, dioctyl-benzyl-amine, N-ethyl-piperidine, N-decyl-piperidine, N-octadecyl-piperidine, N-ethyl-quinoline, N-octyl-quinoline and like bases.

Furthermore instead of the chlorides of carboxylic acids used as initial materials for the prescribed process bromides and iodides of the carboxylic acids may be used. However the bromides and iodides have only a smaller practical interest.

I claim:

1. A process of producing higher molecular ketenes comprising reacting in an anhydrous solvent, an aliphatic carboxylic acid halide containing 6 to 29 carbon atoms in the acyl radical with a strongly basic tertiary amine and recovering a ketene containing an aliphatic substituent radical of from 4 to 27 carbon atoms.

2. A process which comprises reacting in an anhydrous solvent, a fatty acid halide of 6 to 29 carbon atoms with a tertiary alkyl mono amine free of active hydrogen and thereafter isolating the ketene, the entire process being carried out under anhydrous conditions.

3. A higher molecular ketene containing a mono valent aliphatic substituent radical of 4 to 27 carbon atoms.

4. A higher molecular ketene containing a mono valent aliphatic hydrocarbon substituent of 14 carbon atoms.

5. A higher molecular ketene containing a mono valent aliphatic hydrocarbon substituent of 10 carbon atoms.

RICHARD HUETER.